(12) United States Patent
Matsuno et al.

(10) Patent No.: US 7,931,113 B2
(45) Date of Patent: Apr. 26, 2011

(54) STEERING CONTROL SYSTEM FOR VEHICLE

(75) Inventors: Koji Matsuno, Tokyo (JP); Satoru Akiyama, Tokyo (JP); Shinji Matsushita, Tokyo (JP); Shiro Ezoe, Tokyo (JP); Masaru Kogure, Tokyo (JP); Hajime Oyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 975 days.

(21) Appl. No.: 11/477,347

(22) Filed: Jun. 30, 2006

(65) Prior Publication Data

US 2007/0039775 A1    Feb. 22, 2007

(30) Foreign Application Priority Data

Jul. 5, 2005   (JP) ................................ 2005-196722
Jul. 13, 2005  (JP) ................................ 2005-204748

(51) Int. Cl.
    *B62D 5/04*   (2006.01)
(52) U.S. Cl. ............................ 180/443; 180/422; 701/41
(58) Field of Classification Search .................. 180/443, 180/422; 701/41
    See application file for complete search history.

(56) References Cited

U.S. PATENT DOCUMENTS

| | | | |
|---|---|---|---|
| 5,130,926 A * | 7/1992 | Watanabe et al. ............... | 701/37 |
| 5,265,019 A | 11/1993 | Harara et al. | |
| 6,041,884 A * | 3/2000 | Shimizu et al. ............... | 180/443 |
| 6,598,699 B2 * | 7/2003 | Takehara et al. ............... | 180/446 |
| 6,675,929 B2 * | 1/2004 | Fujiwara et al. ............... | 180/444 |
| 6,926,115 B2 * | 8/2005 | Masaki et al. ............... | 180/446 |
| 7,159,394 B2 * | 1/2007 | Tsuda et al. ............... | 60/368 |
| 7,275,617 B2 * | 10/2007 | Endo et al. ............... | 180/402 |
| 2004/0016591 A1 * | 1/2004 | Kojo et al. ............... | 180/443 |
| 2004/0059485 A1 | 3/2004 | Momiyama et al. | |
| 2004/0193374 A1 * | 9/2004 | Hac et al. ............... | 701/301 |
| 2005/0061576 A1 * | 3/2005 | Nakamura et al. ............ | 180/444 |
| 2005/0173184 A1 | 8/2005 | Kojima et al. | |
| 2006/0000209 A1 * | 1/2006 | Tsuda et al. ............... | 60/422 |

FOREIGN PATENT DOCUMENTS

| | | |
|---|---|---|
| EP | 1 380 490 | 1/2004 |
| EP | 1 561 668 | 8/2005 |
| JP | 2004-168166 | 6/2004 |

OTHER PUBLICATIONS

European Search Report dated Oct. 16, 2006 in Application No. EP 06 01 3972.

* cited by examiner

*Primary Examiner* — Joanne Silbermann
*Assistant Examiner* — Maurice Williams
(74) *Attorney, Agent, or Firm* — Smith, Gambrell & Russell, LLP (57) ABSTRACT

A steering control section has a first steering angle correction amount calculating section, a second steering angle correction amount calculating section, and a motor rotational angle calculating section. The first correction amount calculating section calculates a first correction amount based on a vehicle speed and an actual steering wheel angle. The second correction amount calculating section calculates a second correction amount through multiplying a control gain corresponding to the vehicle speed with a value calculated by low-pass filtering a differential value of steering wheel angle. The motor rotational angle calculating section calculates a motor rotational angle corresponding to the value adding the first and second steering angle correction amount, and outputs it to a motor driving section so as to drive an electric motor for correcting the steering angle. Thereby, an unstable vehicle behavior due to a resonance of a yaw motion caused in the steering operation can be suppressed.

2 Claims, 10 Drawing Sheets

STEERING CONTROL SYSTEM FOR VEHICLE

BACKGROUND OF THE INVENTION

1. Field of the Invention

The present invention relates to a steering control system for a vehicle, more particularly, to a front-wheel steering control system for correcting a steering angle of front wheels by an electric motor or the like.

The present application claims priority from Japanese Application Nos. 2005-196722 and 2005-204748, the disclosures of which are incorporated herein by reference.

2. Description of the Related Prior Art

Conventionally, there have been proposed many techniques for correcting a steering angle of front wheels of a vehicle being input by a driver. For example, Japanese Patent Application Laid-Open No. 2004-168166 discloses a steering control apparatus with a variable steering gear ratio in which a differential factor depending on a steering angular velocity is shifted from a positive range to a negative range in proportion to an increase of a vehicle speed. Moreover, a steering gear ratio thereof is decided by adding a proportional factor depending on the steering angle and the differential factor as mentioned above.

However, according to the front-wheel steering control apparatus which corrects a steering angle only by the vehicle speed and an operation of the driver as disclosed in the above mentioned prior art, there arises a problem that it is difficult to improve a yaw response of the vehicle in association with sufficiently suppressing an unstable vehicle behavior due to a resonance of a yaw movement of steering controls.

SUMMARY OF THE INVENTION

In view of a consideration to the foregoing problem, an object of the present invention is to provide a steering control system of a vehicle which can securely suppress an unstable vehicle behavior due to a resonance of a yaw movement caused by a steering operation, improving a yaw response of the vehicle.

According to the present invention, there is provided a vehicle steering control apparatus having a steering upper shaft for inputting a steering operating angle, a steering lower shaft for steering front wheels of the vehicle, a steering angle sensor for detecting a steering angle of the steering upper shaft, and a vehicle speed sensor for detecting a speed of the vehicle. The vehicle steering control apparatus further comprises steering angle correction calculating means and a steering angle correcting mechanism. The steering angle correction calculating means calculates a correction amount of a steering angle of the steering lower shaft. Also, the steering angle correcting mechanism is provided between the steering upper shaft and the steering lower shaft for correcting the steering angle of the steering lower shaft through adding the correction amount calculated by the steering angle correction calculating means to the steering angle of the steering upper shaft detected by the steering angle sensor.

The steering angle correction calculating means calculates a first correction amount of the steering angle of the steering lower shaft based on the vehicle speed as detected by the vehicle speed sensor, and a second correction amount thereof based on a value obtained through low-pass filtering a differential value of the steering angle detected by the steering angle sensor, wherein a total correction amount of the steering angle of the steering lower shaft is obtained through adding the first correction amount based on the vehicle speed detected by the vehicle speed sensor to the second correction amount.

The vehicle steering control apparatus may further comprise a yaw rate sensor for detecting the yaw rate of the vehicle, wherein the steering angle correction calculating means calculates a third correction amount of the steering angle of the steering lower shaft based on the yaw rate detected by the yaw rate sensor instead of the second correction amount.

In addition, the vehicle steering control apparatus may further comprise a yaw rate sensor for detecting the yaw rate of the vehicle and a transverse acceleration sensor for detecting the transverse acceleration of the vehicle, wherein the steering angle correction calculating means calculates an angular velocity of a vehicle slip based on the yaw rate and the transverse acceleration of the vehicle, and further calculates a fourth correction amount of the steering angle of the steering lower shaft based on the angular velocity of a vehicle slip instead of the second correction amount. In both the cases of the third and fourth correction amounts also, the total correction amount of the steering angle of the steering lower shaft is obtained through adding either of them to the first correction amount based on the vehicle speed.

Thereby, it allows the vehicle steering control apparatus of the present invention to improve the yaw response of the vehicle, specifically, to securely suppress the unstable vehicle behavior due to the resonance of yaw movement caused by the steering operation of a user.

BRIEF DESCRIPTION OF THE DRAWINGS

These and other objects and advantages of the present invention will become clearly understood from the following description with reference to the accompanying drawings, wherein.

DETAILED DESCRIPTION OF THE PREFERRED EMBODIMENTS

Figure 1:
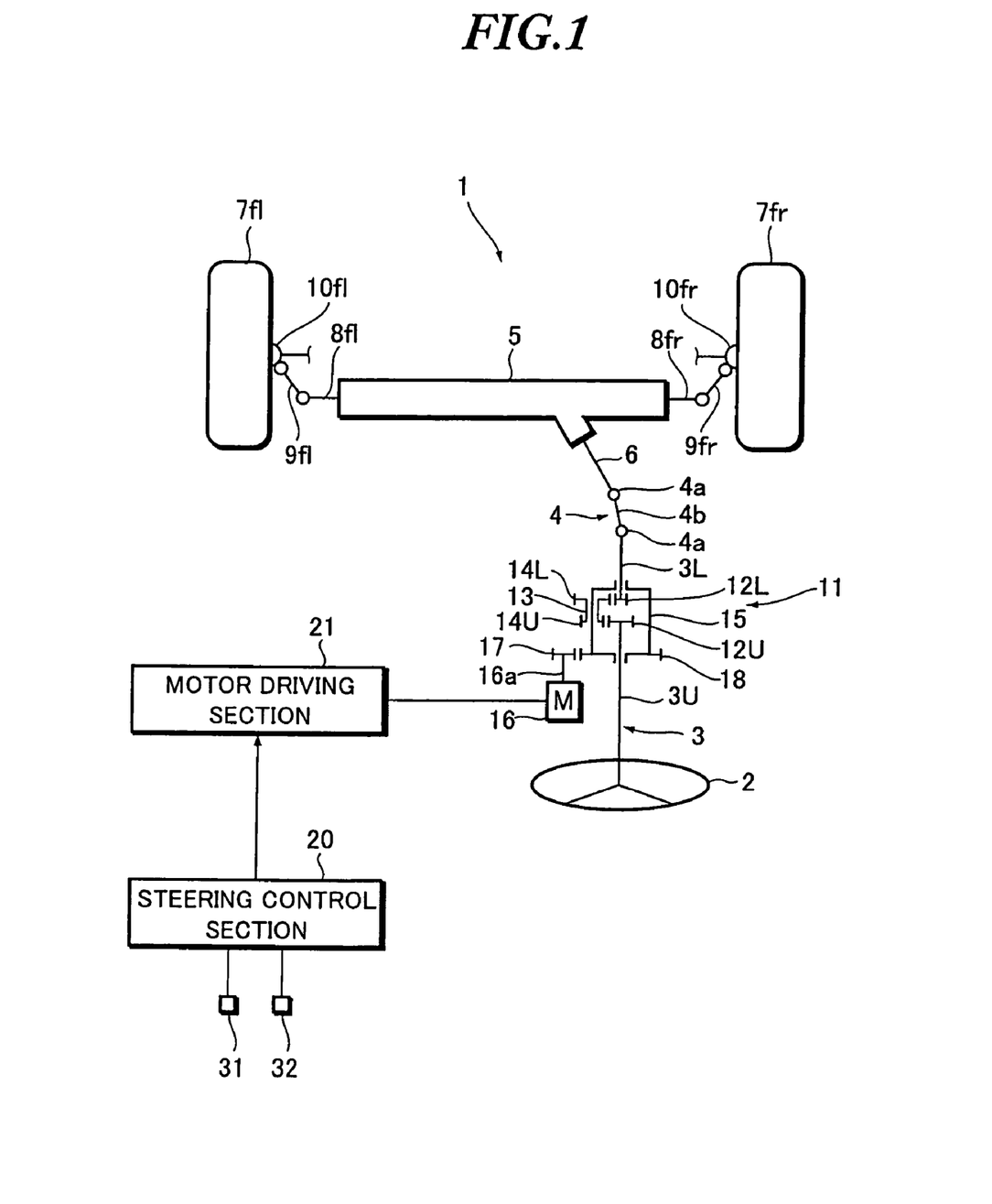
FIG. 1 is an explanatory view roughly showing a steering control system of vehicle front wheels according to one embodiment of the present invention.

Hereinafter, the preferred first embodiment of the present invention will be described in accordance with FIGS. 1 to 6. As shown in FIG. 1, a vehicle steering control apparatus 1 includes a steering wheel 2, and a steering shaft 3 as extended therefrom and connected to a pinion shaft 6 extended from a gear box 5 via a joint portion 4 formed by a universal joints 4a, 4a and a joint shaft 4b.

A tie rod 8fl is extended from the gear box 5 to a left front wheel 7fl, and on the other hand, another tie rod 8fr is extended to a front right wheel 7fr.

Tie rod ends of the tie rods 8fl, 8fr are connected to acceleration housings 10fl, 10fr for freely and rotationally supporting each left and right wheels 7fl, 7fr via knuckle arms 9fl, 9fr.

A steering angle correcting mechanism 11 for the front wheels is provided at a middle portion of the steering shaft 3 to vary a steering gear ratio. The steering shaft 3 comprises an upper shaft 3U extending upward from the steering angle correcting mechanism 11 and a lower shaft 3L extending downward therefrom.

An explanation about the structure of the steering angle correcting mechanism 11 will be given as follows. A lower portion of the upper shaft 3U and an upper portion of the lower shaft 3L are separately fixed to a pair of sun gears 12U,12L for rotating about the same rotating axis, and the pair of the sun gears 12U, 12L are individually and separately meshed with planetary gears 14U, 14L fixed on a plurality (for example, three) of pinion shafts 13.

The pair of the sun gears 12U,12L are stored in a carrier 15 for co-axially supporting the pinion shaft 13, and a driven gear 18 for meshing with a drive gear 17 fixed on an output shaft 16a of an electric motor 16 is provided on an outer and upper periphery of the carrier 15.

The electric motor 16 is driven by a motor driving section 21 which is structured to rotate the motor 16 in accordance with signals corresponding to a rotational angle thereof inputted from a steering control section 20 as correcting means of the front wheel steering angle.

There are further provided a vehicle speed sensor 31 for detecting a vehicle speed V and a steering wheel angle sensor 32 for detecting a steering wheel angle θHd inputted by the driver, and therefore the signals from the vehicle speed sensor 31 and the steering wheel angle sensor 32 are inputted into a steering control section 20 including a steering angle correction calculating means therein.

Next, the steering control section 20 calculates the correction amount of the front wheel steering angle to be added to the steering wheel angle inputted by the driver on the basis of each input signal described above according to a steering control program described later in order to keep an appropriate vehicle behavior, and then outputs a motor rotational angle θM based on the correction amount to the motor driving section 21.

Figure 2:
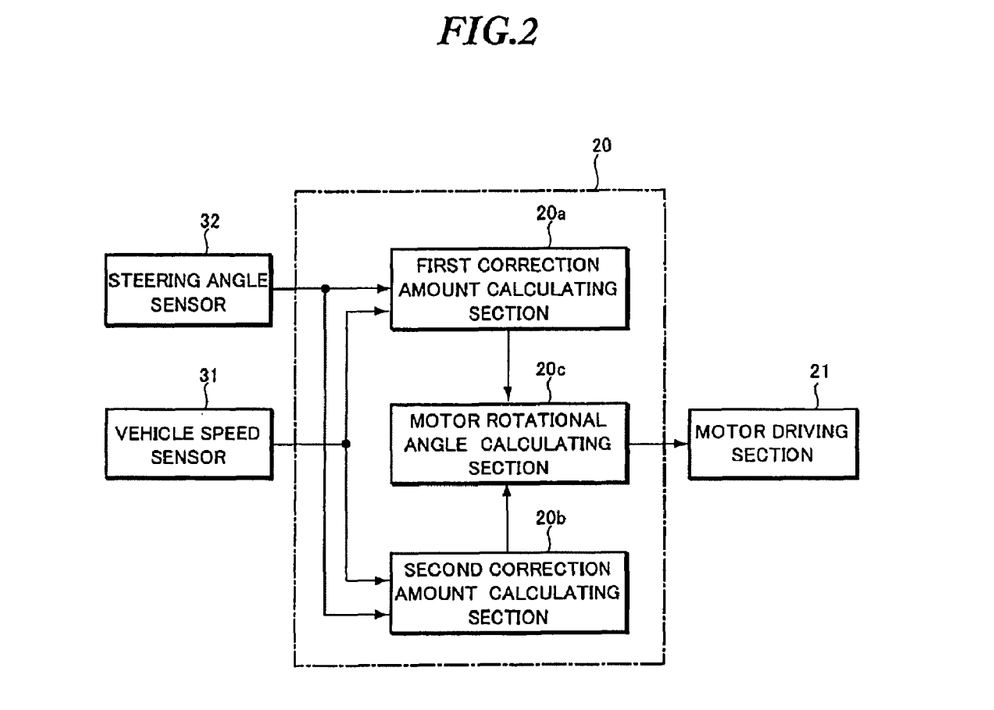
FIG. 2 is a functional block diagram of the vehicle steering control apparatus as shown in FIG. 1.

That is, as shown in FIG. 2, the steering control section 20 comprises mainly a first correction amount calculating section 20a of the front wheel steering angle, a second correction amount calculating section 20b of the front wheel steering angle and a motor rotational angle calculating section 20c.

Figure 4:
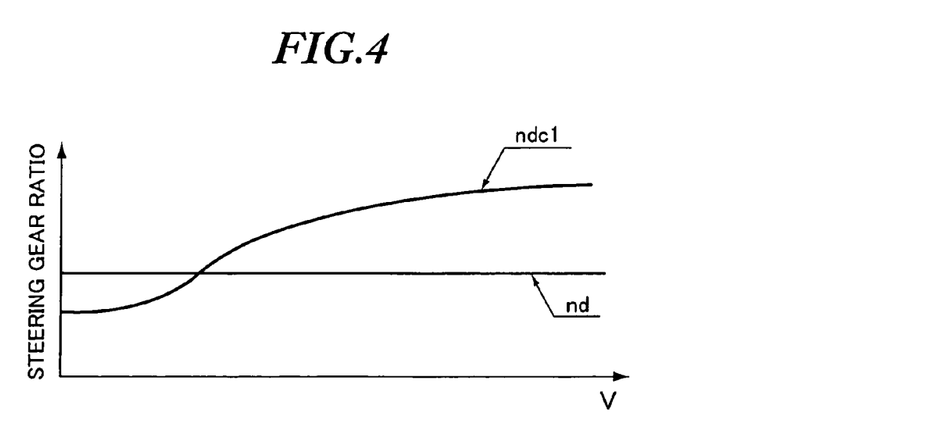
FIG. 4 is a characteristics chart of a steering gear ratio responsive to a vehicle speed according to the present invention.

The vehicle speed V from the vehicle speed sensor 31 and the steering wheel angle θHd from the steering wheel angle sensor 32 are inputted into the first correction amount calculating section 20a. And, a first correction amount δHc1 of the steering wheel angle θHd is calculated by the following equation (1), and is outputted to the motor rotational angle calculating section 20c.

$$\delta Hc1 = ((\theta Hd/ndcl) - (\theta Hd/nd)) \cdot nc \quad (1)$$

wherein "nd" is a steering gear ratio at the driver side (when the electric motor 16 is stopped, the steering gear ratio affects a steering operation by the driver, which is decided by the pair of the sun gears 12U and 12L, the pair of the planetary gears 14U and 14L and the steering gear box 5.) Also, "nc" is a steering gear ratio at the side of the front wheel steering angle correcting mechanism 11 (when the motor 16 is driven during no operation of the steering wheel, the steering gear ratio affects the vehicle, which is decided by the drive gear 17 and the driven gear 18). Further, "ndc1" is a vehicle-speed-sensitive steering gear ratio gained by a preset map and calculating equations. This vehicle-speed-sensitive steering gear ratio "ndcl" is, for example, set as shown in FIG. 4, wherein when the vehicle speed is low, it is set to have a quick responsive characteristics against the driver side steering gear ratio "nd", and also when the vehicle speed is high, it is set to have a slow responsive characteristics against the driver side steering gear ratio "nd".

The vehicle speed V and the steering wheel angle θHd are inputted also to the second correction amount calculating section 20b, where the second correction amount δHc2 for the steering wheel angle θHd is calculated by the following equation (2), and then is outputted to the motor rotational angle calculating section 20c.

$$\delta Hc2 = Gcd \cdot (1/(1+Tcd \cdot S)) \cdot (d\theta Hd/dt)/nd \quad (2)$$

wherein "Gcd" is a control gain, "Tcd" is a time constant of the low pass filter, "S" is a Laplace operator, and (dθHd/dt) is a differential value of the front wheel steering angle.

Accordingly, the above equation (2) indicates that the low-pass filtering process is prosecuted to multiply the differential value of the front wheel steering angle by the (1/(1+Tcd·S). The time constant Tcd in the low pass filtering process is set at a reciprocal of an angular velocity of a resonance oscillation in a yaw motion corresponding to the inputted steering operating angle, wherein the resonance frequency is in, for example, 1-2 Hz.

Figure 5:
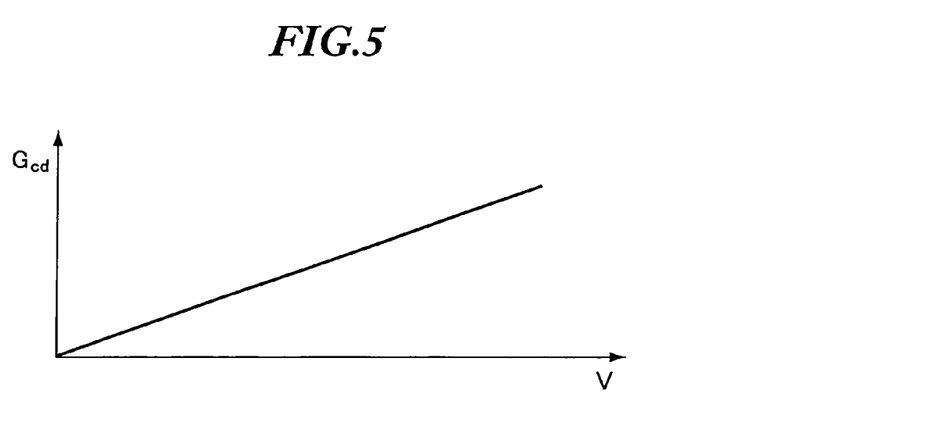
FIG. 5 is a characteristics chart of a control gain as shown in FIG. 3.

Also, since the characteristics with a steep peak for the frequency of the steering operation becomes extremely remarkable in proportion with an increase of the vehicle speed V, the control gain Gcd is set at a larger value as the vehicle speed V becomes higher by referring to the maps or the like, as shown in FIG. 5.

The motor rotational angle calculating section 20c receives the first correction amount δHc1 of the steering wheel angle θHd from the first correction amount calculating section 20a and the second correction amount δHc2 of the steering wheel angle θHd from the second correction amount calculating section 20b as the inputted value. Then, the motor rotational angle θM is calculated by the following equation (3), and is outputted to the motor driving section 21.

$$\theta M = (\delta Hc1 + \delta Hc2) \cdot nc \quad (3)$$

Figure 3:
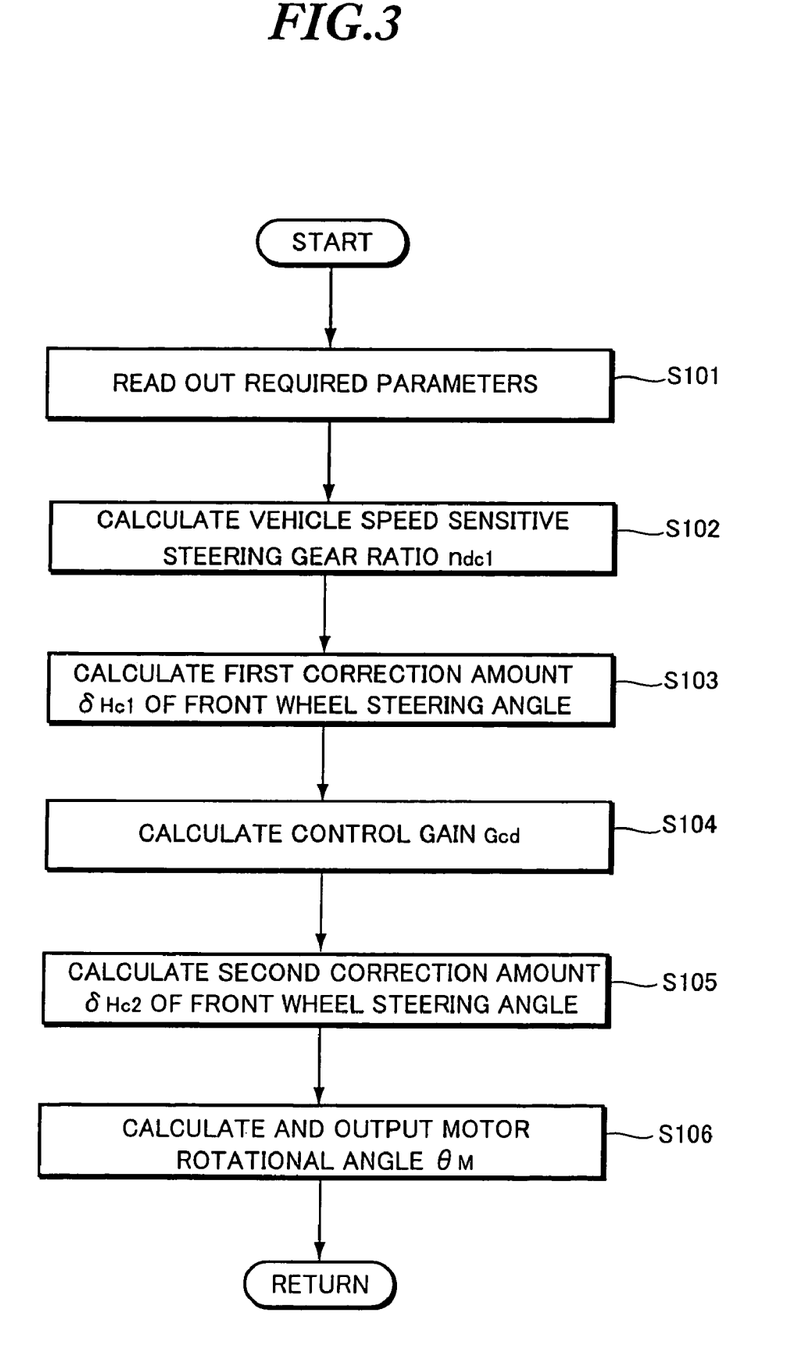
FIG. 3 is a flowchart of a program included in the vehicle steering control apparatus of FIG. 1.

Next, the steering control program executed by the above mentioned steering control section 20 will be explained by referring to the flowchart shown in FIG. 3.

First, some desired parameters, namely, the vehicle speed V and the steering wheel angle θHd inputted by the driver are read at step 101 ("step" is abbreviated as "S" in the following description).

Second, at S102, the vehicle-speed-sensitive steering gear ratio "ndcl" is calculated by utilizing the map and/or calculating equations preset in the first correction amount calculating section 20a.

Next, at S103, the first correction amount calculating section 20a calculates the first correction amount δHc1 of the steering wheel angle θHd by using the aforementioned equation (1).

Next, at S104, the second front wheel correction amount calculating section 20b calculates the control gain Gcd by using the aforementioned equation (2).

Next, at S105, the second correction amount calculating section 20b calculates the second correction amount δHc2 of the steering wheel angle θHd by using the aforementioned equation (2).

Finally, at step S106, the calculating section 20c of the motor rotational angle calculates the motor rotational angle θM by using the aforementioned equation (3), outputs it to the motor driving section 21, and then exits the program.

Figure 6:
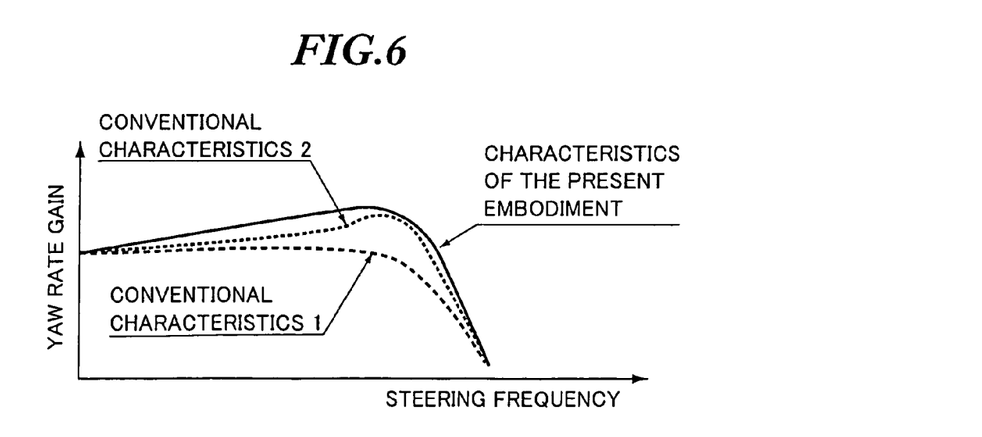
FIG. 6 is a characteristics chart showing a relationship between a steering frequency and a yaw rate gain.

The effect of the present embodiment will be explained hereinafter. As shown in FIG. 6, the "conventional characteristics 1", which has no peak value with regard to the steering frequency, has the following features, that is, the response to a quick steering operation is very stable, but dull, in other words, there occurs a problem that a performance for avoiding a danger is inferior. On the contrary, in the "conventional characteristics 2", which has a steep peak value with regard to the steering frequency, there occurs a problem that the vehicle is easy to spin and is apt to be very unstable when changing over a direction to steer at a vicinity of the resonance frequency of the yaw moment. Accordingly, the low-pass filtering operation for the differential value (dθHd/dt) of the front wheel steering angle allows the steering frequency to gradually increase the gain and have no apparent peak value, which is the feature according to the first embodiment of the present invention, so that an improvement of a response ability for a quick steering operation and a stable control ability (an avoidance of the spin) can be realized. Specifically, the yaw response of the vehicle can be securely improved, and also the unstable vehicle behavior according to the resonance of the yaw movement in the steering operation can be securely suppressed.

Additionally, noise elements which may be included in the differential value (dθHd/dt) of the front wheel steering angle can be effectively eliminated by the low-pass filtering operation.

The second embodiment of the present invention will be explained hereinafter with FIGS. 7-11. Moreover, the second embodiment relates to a second front wheel steering angle correction amount calculating section 30 where the second correction amount is calculated on the basis of a slip angular velocity of the vehicle comprising a yaw rate and a transverse acceleration. Since the other elements and functions are substantially the same as ones of the first embodiment, the same symbols are given to the same elements as ones of the first embodiment, and the respective explanations thereof are omitted.

Figure 7:
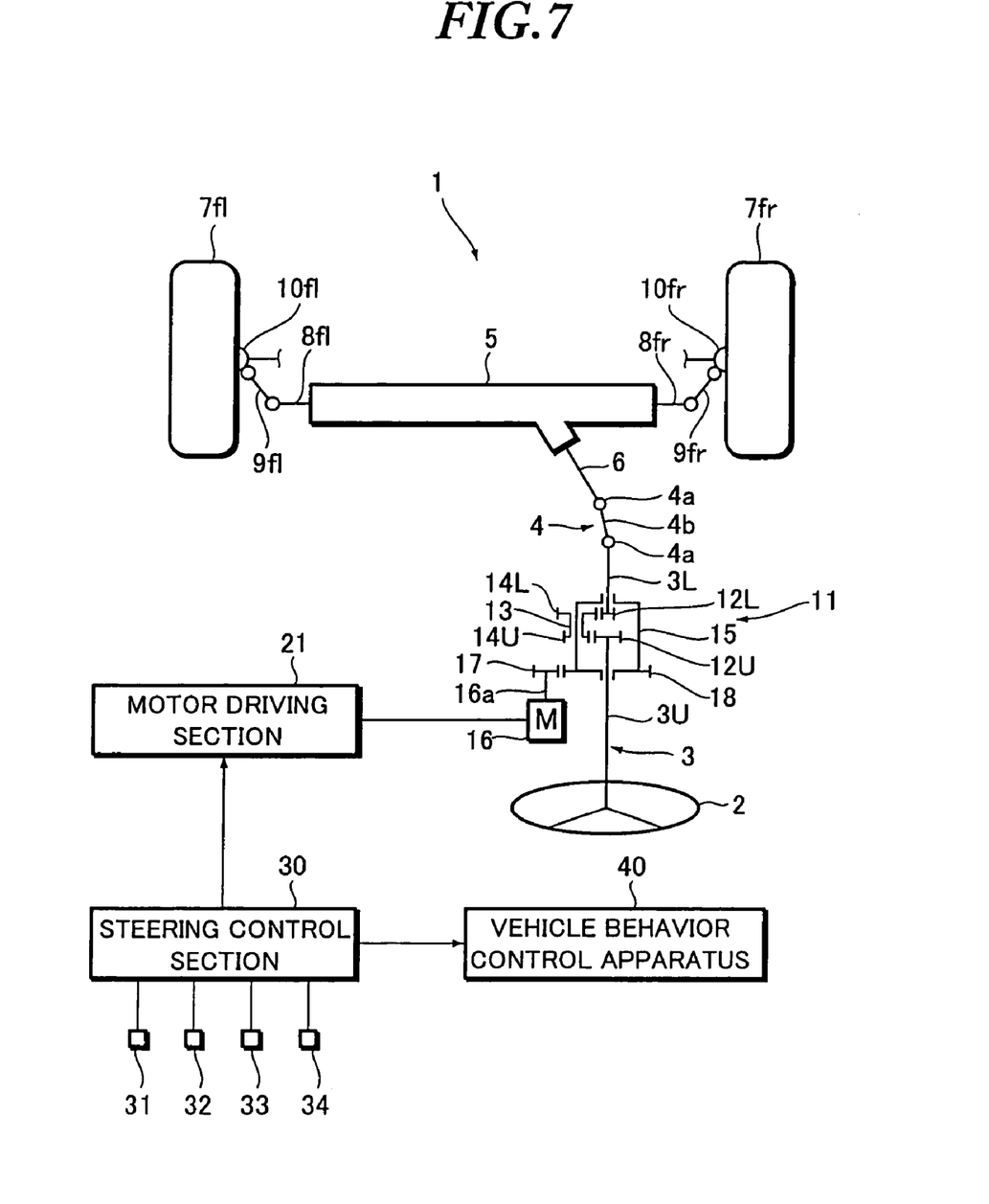
FIG. 7 is an explanatory view roughly showing a vehicle steering control apparatus according to another embodiment of the present invention.

As shown in FIG. 7 which is an explanatory view roughly illustrating a vehicle steering control apparatus according to another embodiment, a vehicle behavior control apparatus 40 is mounted on the vehicle as control means of a vehicle behavior. The vehicle behavior control apparatus 40 is, for example, a braking force control apparatus for generating a yaw moment to the vehicle by adding a braking force to a selected wheel. Concretely, the vehicle behavior control apparatus 40 calculates a target yaw rate on the basis of the vehicle speed and the steering angle of the front wheels by using an equation of motion of the vehicle. Then, it is decided whether the present vehicle running condition is in an over-steering condition or in an under-steering condition through comparing an actual yaw rate with the targeted yaw rate. As the result, the braking force is applied to an outside front wheel while turning in order to correct the over-steering condition, and also the braking force is applied to an inside rear wheel while turning in order to correct the under-steering condition. Further, the vehicle behavior control apparatus 40 is not limited to one using the braking force control apparatus as mentioned above, but it may be one using a driving force distributing apparatus for left or right driving wheels.

The vehicle is further provided with a yaw rate sensor 33 and a transverse acceleration sensor 34 in addition to the vehicle speed sensor 31 and the steering wheel angle sensor 32, signals from which are transmitted to a steering control section 30. The yaw rate sensor 33 detects an actual yaw rate γ of the vehicle, and the transverse acceleration sensor 34 detects an actual transverse acceleration $(d^2y/dt^2)$ thereof.

The steering control section 30 calculates the correction amount of the front wheel steering angle added to the actual steering wheel angle inputted by the driver based on each inputted signal in accordance with the steering control program as described later to adequately keep the vehicle behavior, and outputs the signal of motor rotational angle θM to the motor driving section 21.

Figure 8:
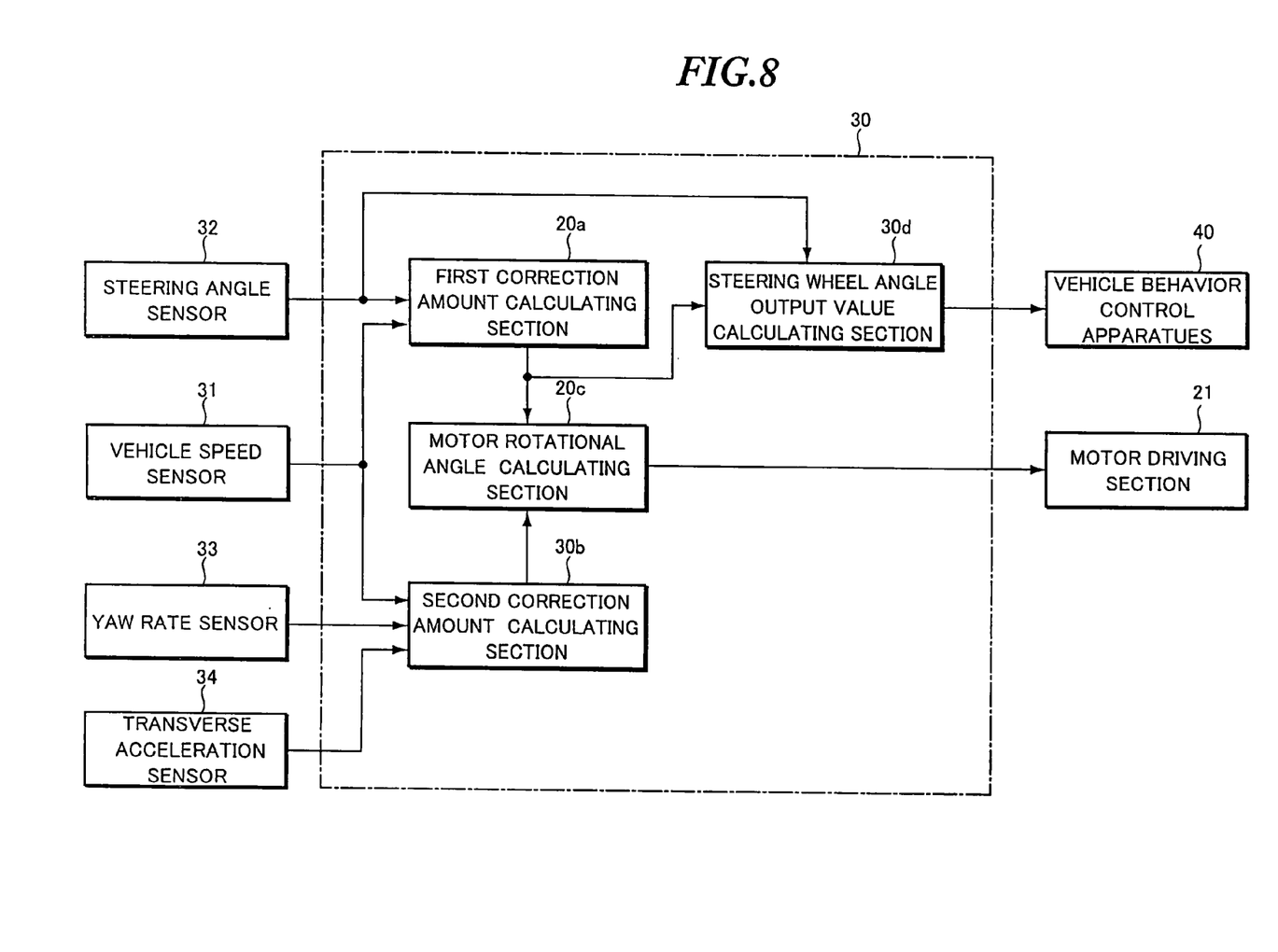
FIG. 8 is a functional block diagram of the vehicle steering control apparatus as shown in FIG. 7.

More specifically, as shown in FIG. 8, the steering control section 30 is mainly constructed by the first correction amount calculating section 20a, a second correction amount calculating section 30b, the motor rotational angle calculating section 20c, and a steering wheel angle output value calculating section 30d.

In the same fashion as the first embodiment, the vehicle speed V is inputted from the vehicle speed sensor 31 and the steering wheel angle θHd from the steering angle sensor 32 are inputted into the first correction amount calculating section 20a. Further, the first correction amount δHc1 of the steering wheel angle θHd is calculated by the same following equation (1) as described in the first embodiment, and is outputted to the motor rotational angle calculating section 20c and the steering wheel angle output value calculating section 30d.

$$\delta Hc1 = ((\theta Hd/ndcl) - (\theta Hd/nd)) \cdot nc \quad (1)$$

The explanation for each element of the above equation (1) is omitted since the respective elements are the same as ones of the first embodiment.

Next, the vehicle speed V is inputted from the vehicle speed sensor 31 to the second correction amount calculating section 30b also. Further, the actual yaw rate γ from the yaw rate sensor 33 and an actual transverse acceleration $(d^2y/dt^2)$ from the transverse acceleration sensor 34 are inputted into the second calculating section 30b. Then, the second correction amount δHc2 of the steering wheel angle θHd is calculated by the following equation (4), and is outputted to the motor rotational angle calculating section 20c.

$$\delta Hc2 = -Gcg1 \cdot Gcg2 \cdot (d\beta/dt) \quad (4)$$

wherein (dβ/dt) is an angular velocity of a vehicle slip, and is calculated by the following equation (5).

$$(d\beta/dt) = \gamma - ((d^2y/dt^2)/V) \quad (5)$$

Figure 10:
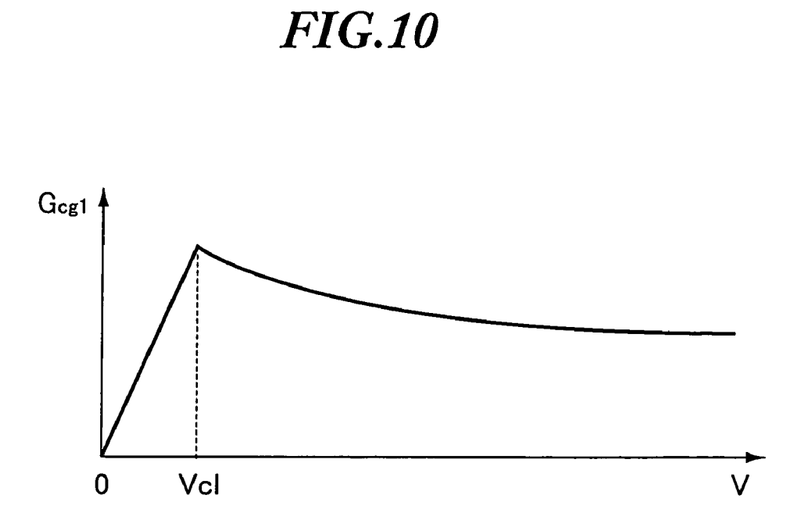
FIG. 10 is a characteristics chart of the first control gain as shown in FIG. 9.

Further, "Gcg1" in the equation (4) is a first control gain, which is set beforehand by, for example, an experiment and a calculation thereon as shown in FIG. 10. This map is set by the following equation (6) in the range where the vehicle speed V is higher than the value of Vcl.

$$Gcg1 = 1/G\gamma \quad (6)$$

wherein "$G\gamma$" shows a yaw rate gain for the steering angle, and is calculated by the following equation (7).

$$G\gamma = (1/(1 + A \cdot V^2)) \cdot (V/(1 \cdot nc)) \quad (7)$$

wherein "A" is a stability factor, and "1" is a wheel base.

The first control gain Gcg1 in the range below the value Vc1 in the map of FIG. 10 is set as a linear to become smaller as the vehicle speed becomes lower. The reason is that since, in a low speed range, the yaw rate gain $G\gamma$ becomes small, while the first control gain Gcg1 becomes too large, if not set like FIG. 10, so that a calculation accuracy for the angular velocity of the vehicle slip becomes low.

As described above, through setting the first control gain Gcg1 in view of the yaw rate gain $G\gamma$, a yaw rate gain per a unit of steering angle correction becomes constant, so that an interference degree of the control for the steering operation at the high and low speeds can be kept constant.

Figure 11:
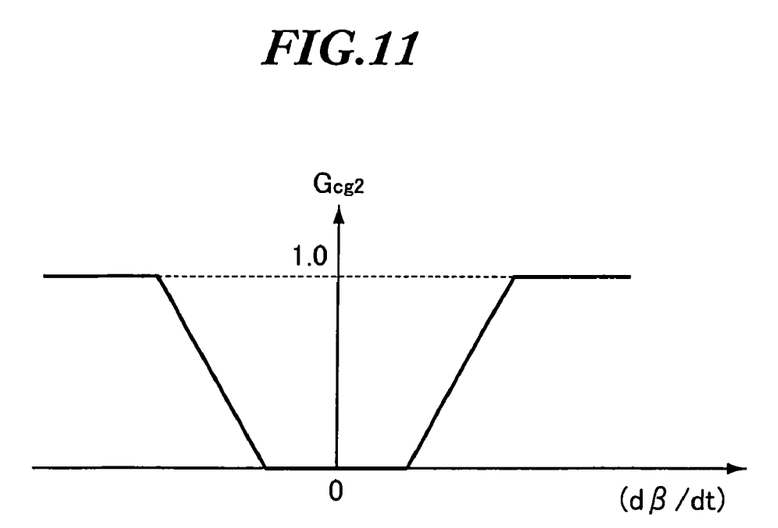
FIG. 11 is a characteristics chart of the second control gain as shown in FIG. 9.

Further, Gcg2 in the above described equation (4) is a second control gain, which is set beforehand from, for example, the predetermined experiments and calculations as shown in FIG. 11. This second control gain Gcg2 is set in accordance with the angular velocity ($d\beta/dt$) of the vehicle slip according to the map, in which the value of Gcg2 is set at "0" (zero) in the range where an absolute value of the angular velocity ($d\beta/dt$) is small. Accordingly, when this second control gain Gcg2 is multiplied as shown in the equation (4), the second correction amount $\delta Hc2$ of the steering wheel angle $\theta Hd$ becomes 0 (zero) in the small range of the vehicle slip angular velocity. In other words, the above described equation (4) causes a dead zone for the angular velocity ($d\beta/dt$) of the vehicle slip. In this way, unnecessary controls can be avoided by providing the dead zone in the range of the small angular velocity ($d\beta/dt$) of the vehicle slip.

Then, the motor rotational angle calculating section 20c receives the first correction amount $\delta Hc1$ of the steering wheel angle $\theta Hd$ from the first correction amount calculating section 20a and the second correction amount $\delta Hc2$ thereof from the second correction amount calculating section 30b. Afterwards, the motor rotational angle $\theta M$ is calculated by the following equation (3) which is identical with that of the first embodiment, and is outputted to the motor driving section 21.

$$\theta M = (\delta Hc1 + \delta Hc2) \cdot nc \quad (3)$$

The steering wheel angle output value calculating section 30d receives the respective signals of the steering wheel angle $\theta Hd$ from the steering wheel angle sensor 32 and the first steering angle correction amount $\delta Hc1$ of the front wheel from the correction amount calculating section 20a. And then, the steering wheel angle output value calculating section 30d outputs a steering wheel angle $\theta Hout$ to the vehicle behavior control apparatus 40 after calculating it by the following equation (8).

$$\theta Hout = \theta Hd + \delta Hc1 \cdot nc \quad (8)$$

That is, the above described equation (8) does not contain the value of $\delta Hc2 \cdot nc$, which is the correction amount according to the vehicle slip angle speed ($d\beta/dt$), so that the control with the vehicle behavior control apparatus 40 can be properly executed without intervening with the correction control by the steering control section 30.

Figure 9:
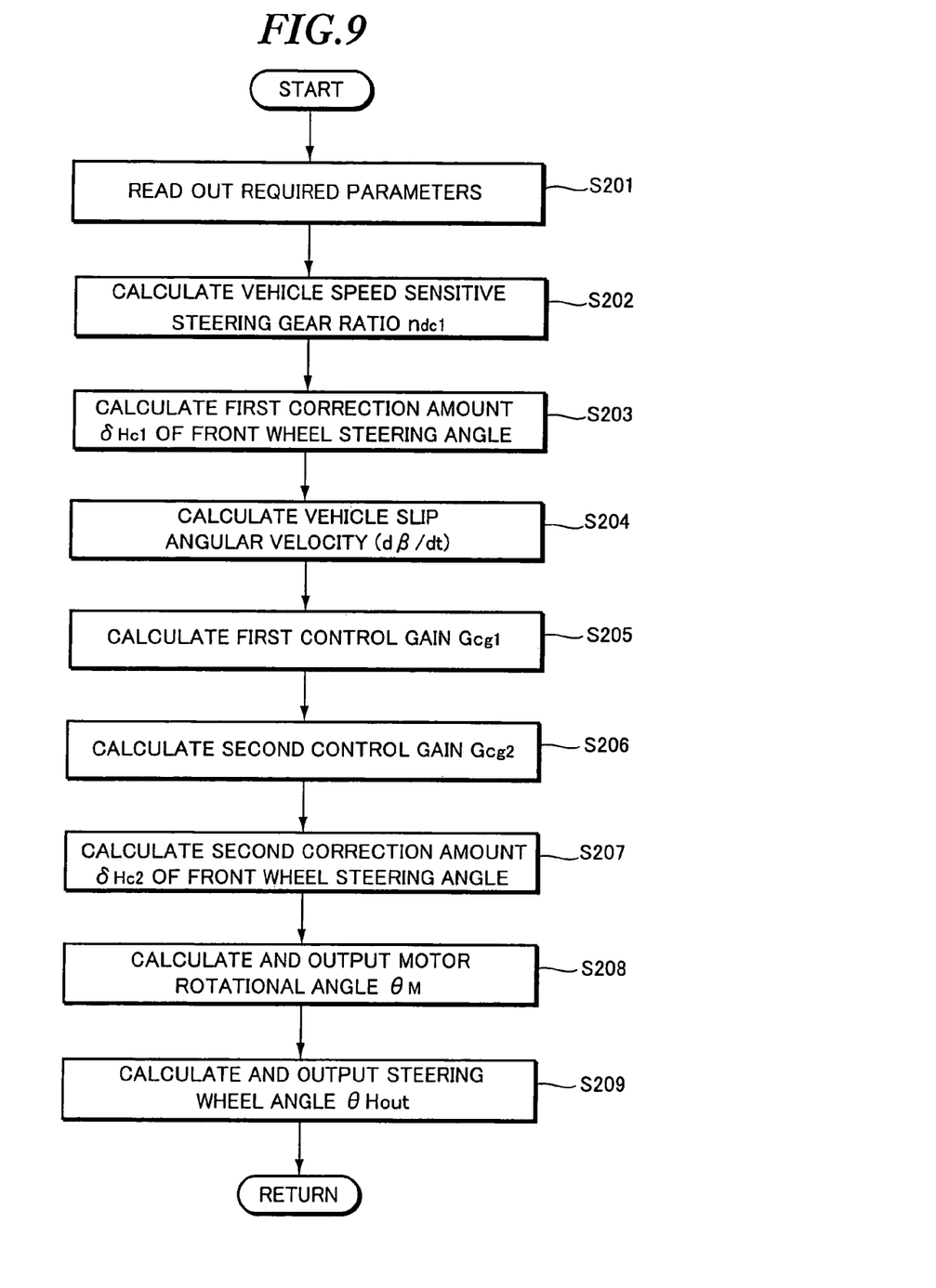
FIG. 9 is a flowchart of a program included in the vehicle steering control apparatus of FIG. 7.

Next, a steering control program executed by the above mentioned steering control section 30 will be explained with the flowchart shown in the FIG. 9.

First, at S201, such required parameters as the vehicle speed V, the steering wheel angle $\theta Hd$ inputted by the driver, an actual yaw rate $\gamma$, and an actual transverse acceleration ($d^2y/dt^2$) are read out.

Next, at S202, the vehicle-speed-sensitive steering gear ratio ndcl is calculated by the preset map and/or equation set in the first correction amount calculating section 20a.

Next, at S203, the first correction amount calculating section 20a calculates the first correction amount $\delta Hc1$ of the steering wheel angle $\theta Hd$ by using the aforementioned equation (1).

Further, at S204, the second correction amount calculating section 30b calculates the vehicle slip angular velocity ($d\beta/dt$) by using the aforementioned equation (5).

Furthermore, at S205, the second correction amount calculating section 30b calculates the first control gain Gcg1 on the basis of any map preset by the experiments, calculations, or the like.

At step S206, the second calculating section 30b calculates the second control gain Gcg2 also in the same fashion as the first control gain Gcg1.

Next, at S207, the second correction amount calculating section 30b calculates the second correction amount $\delta Hc2$ by using the aforementioned equation (4).

Then, at S208, the motor rotational angle calculating section 20c calculates the motor rotational angle $\theta M$ by using the equation (3), and outputs it to the motor driving section 21.

And finally, at step S209, the steering wheel angle output value calculating section 30d calculates the steering wheel angle $\theta Hout$ by using the aforementioned equation (8), outputs it to the vehicle behavior control apparatus 40, and then exits the program.

In this way, according to the second embodiment of the present invention, since the steering angle correction amount is calculated through adding the first correction amount $\delta Hc1$ based on the vehicle speed to the second correction amount $\delta Hc2$ based on the angular velocity ($d\beta/dt$), a yaw response of the vehicle can be improved and also an unstable vehicle behavior due to a resonance of yaw movement caused by the steering operation can be securely suppressed.

Additionally, since the steering wheel angle $\theta Hout$ to be outputted into the vehicle behavior control apparatus 40 does not include the second correction amount $\delta Hc2$ based on the vehicle slip angular velocity ($d\beta/dt$), the control by the vehicle behavior control apparatus 40 does not intervene the control by the steering control section 30, so that it is possible to attain an effective and stable vehicle control.

Figure 12:
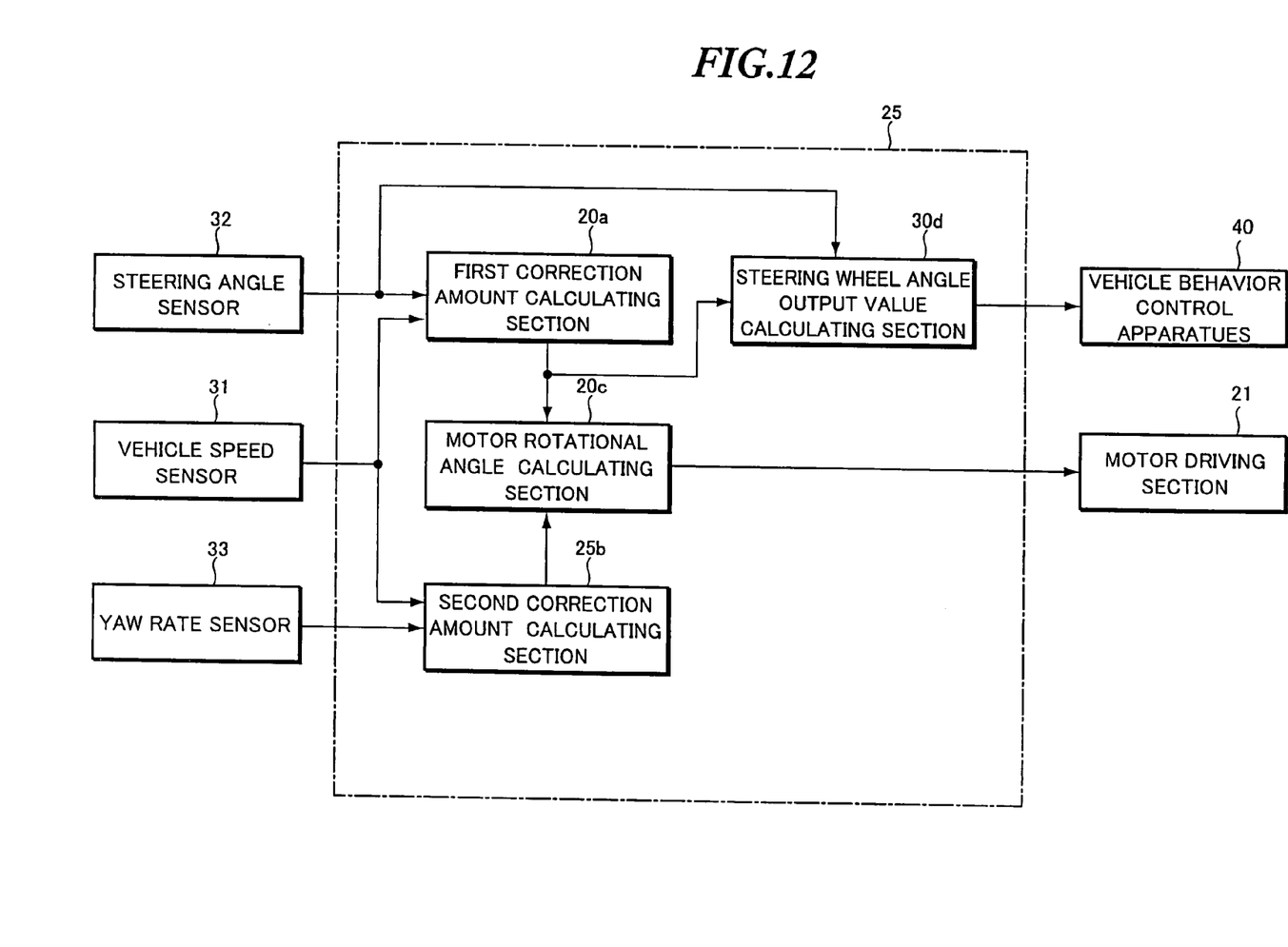
FIG. 12 is a functional block diagram of a vehicle steering control apparatus according to the other embodiment of the present invention.
Figure 13:
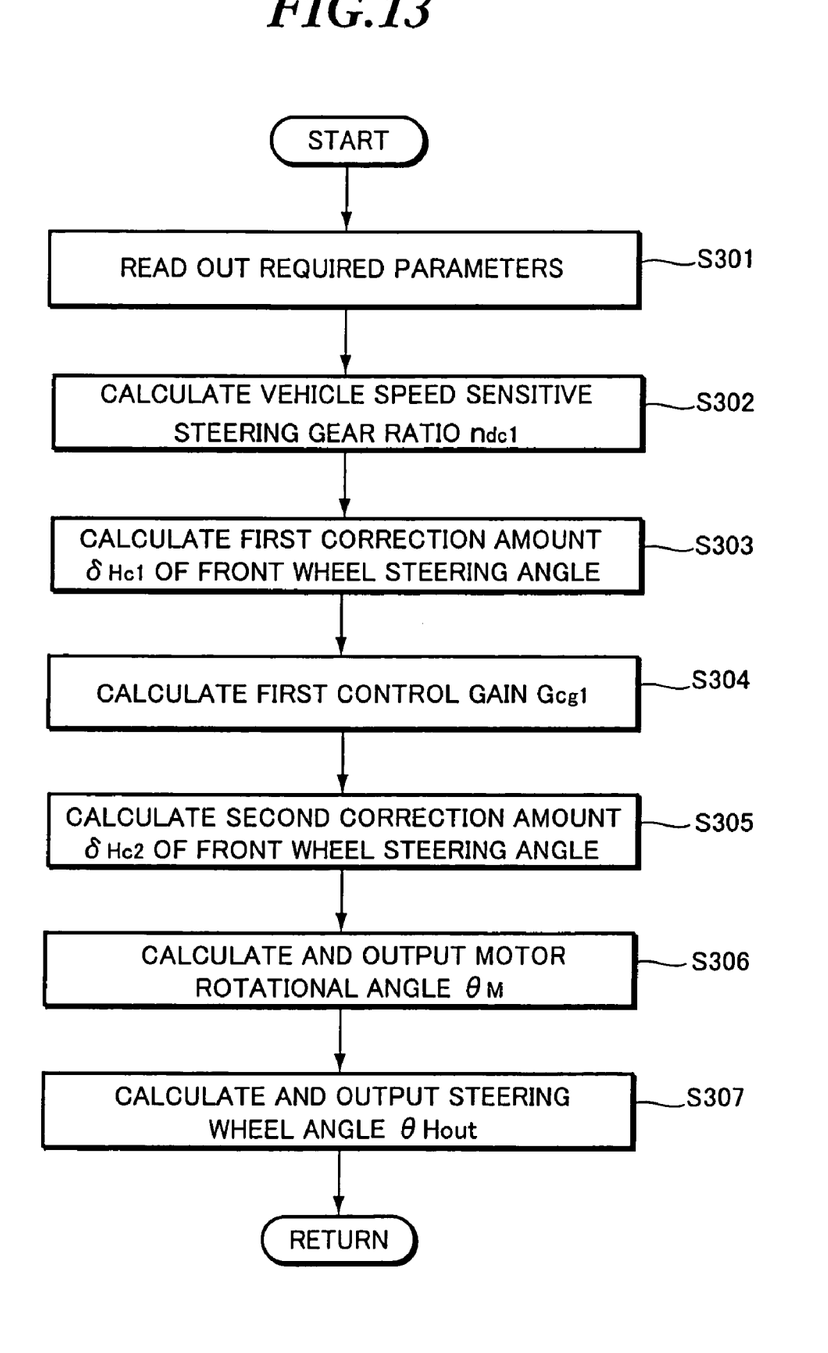
FIG. 13 is a flowchart of a program included in the vehicle steering control apparatus as shown in FIG. 12.

Lastly, FIGS. 12 and 13 show the third embodiment of the present invention. FIG. 12 is the functional block diagram of a steering control section 25, and FIG. 13 is the flowchart of a steering control program thereof. Moreover, the third embodiment relates to the steering control system 25 where the second correction amount is calculated on the basis of an actual yaw rate $\gamma$. Since the other elements and functions are substantially the same as ones of the first and second embodiments, the same symbols are given to the same elements as ones of the first embodiment, and the respective explanations thereof are omitted.

More specifically, the steering control section 25 receives the signals of the vehicle speed V from the vehicle speed sensor 31, the steering wheel angle $\theta Hd$ inputted by the driver from the steering angle sensor 32 and the actual yaw rate $\gamma$ from the yaw rate sensor 33.

Then, the steering control section 25 calculates the front wheel steering angle correction amount to be added to the steering wheel angle $\theta Hd$ inputted by the driver based on each inputted signal as mentioned above according to a steering control program as described later in order to properly maintain the vehicle behavior, and afterwards the signal of the motor rotational angle θM is transmitted to the motor driving section 21.

The steering control section 25 has mainly the first correction amount calculating section 20a, a second correction amount calculating section 25b, the motor rotational angle calculating section 20c, and a steering wheel angle output value calculating section 30d as shown in FIG. 12.

The second correction amount calculating section 25b of the front wheel steering wheel angle θHd receives the signals of the vehicle speed V from the vehicle speed sensor 31, and the actual yaw rate γ from the yaw rate sensor 32. Then, the second correction amount δHc2 is calculated by using the following equation (9), and outputted to the motor rotational angle calculating section 20c.

$$\delta Hc2 = -Gcg1 \cdot \gamma \tag{9}$$

As shown in the flowchart of FIG. 13, the steering control program proceeds to S304 after calculating the first correction amount δHc1 of the steering wheel angle θHd at S303. At S304, the second correction amount calculating section 25b calculates the first control gain Gcg1 on the basis of the map preset by the experiments, calculations or the like in advance, that is, which is set in the same fashion as one of the second embodiment.

Next, the program proceeds to S305, and then the second correction amount calculating section 25b calculates the second correction amount δHc2 of the steering wheel angle θHd by the aforementioned equation (9). And further, the program proceeds to S306 where the motor rotational angle calculating section 20c calculates the motor rotational angle θM with the aforementioned equation (3), and outputs the result to the motor driving section 21.

Lastly, the program proceeds to S307 where the steering wheel angle output value calculating section 30d calculates the steering wheel angle θHout in accordance with the aforementioned equation (8) and then outputs the result to the vehicle behavior control apparatus 40, and afterwards exits the program.

In this way, according to the third embodiment of the present invention, the same effect as the other embodiments thereof can be also attained.

Although the calculated steering wheel angle θHout without the second correction amount δHc2 is outputted to the vehicle behavior control apparatus 40 according the second and third embodiments, the calculated steering wheel angle θHout including the second correction amount δHc2 may be also outputted thereto in the case of a vehicle having no vehicle behavior control apparatus 40 or in the case of characteristics being able to ignore the interference between the correction executed by the steering control section 20, 25 and itself.

While there has been described what are at present considered to be preferred embodiments of the present invention, it will be understood that various modifications may be made thereto, and it is intended that the appended claims cover all such modifications as fall within the true spirit and scope of the present invention.

What is claimed is:

1. A vehicle steering control apparatus, comprising:
   a steering upper shaft for inputting a steering operating angle;
   a steering lower shaft for steering front wheels of the vehicle;
   a steering angle sensor for detecting a steering angle of said steering upper shaft;
   a steering angle correction calculating means for calculating a correction amount of a steering angle of said steering lower shaft, said correction amount including a low-pass filtering based correction component based on a value obtained through low-pass filtering a differential value of said steering angle detected by said steering angle sensor; and
   a steering angle correcting mechanism provided between said steering upper shaft and said steering lower shaft for correcting said steering angle of said steering lower shaft through adding said correction amount calculated by said steering angle correction calculating means to said steering angle of said steering upper shaft detected by said steering angle sensor,
   wherein a time constant of said low-pass filtering is set at a reciprocal of an angular velocity of a resonance oscillation in a yaw motion corresponding to said inputted steering operating angle.

2. A vehicle steering control apparatus, comprising:
   a steering upper shaft for inputting a steering operating angle;
   a steering lower shaft for steering front wheels of the vehicle;
   a steering angle sensor for detecting a steering angle of said steering upper shaft;
   a steering angle correction calculating means for calculating a correction amount of a steering angle of said steering lower shaft, said calculating means comprising a low-pass filtering based calculating section which provides to said correction amount a low-pass filtering based correction component which includes a low-pass filtering value obtained through low-pass filtering a differential value of said steering angle detected by said steering angle sensor; and
   a steering angle correcting mechanism provided between said steering upper shaft and said steering lower shaft for correcting said steering angle of said steering lower shaft through adding said correction amount calculated by said steering angle correction calculating means to said steering angle of said steering upper shaft detected by said steering angle sensor,
   wherein a time constant of said low-pass filtering is set at a reciprocal of an angular velocity of a resonance oscillation in a yaw motion corresponding to said inputted steering operating angle.

* * * * *